(12) United States Patent
Hjerpe et al.

(10) Patent No.: US 7,297,260 B2
(45) Date of Patent: Nov. 20, 2007

(54) SYSTEM AND DEVICES FOR COLLECTING AND TREATING WASTE WATER FROM ENGINE WASHING

(75) Inventors: Carl-Johan Hjerpe, Nacka (SE); Peter Asplund, Hasselby (SE)

(73) Assignee: Gas Turbine Efficiency AB (SE)

( * ) Notice: Subject to any disclaimer, the term of this patent is extended or adjusted under 35 U.S.C. 154(b) by 16 days.

(21) Appl. No.: 10/536,002

(22) PCT Filed: Jun. 14, 2004

(86) PCT No.: PCT/SE2004/000922

§ 371 (c)(1),
(2), (4) Date: May 20, 2005

(87) PCT Pub. No.: WO2005/121509

PCT Pub. Date: Dec. 22, 2005

(65) Prior Publication Data

US 2006/0081521 A1    Apr. 20, 2006

(51) Int. Cl.
*B08B 3/02* (2006.01)
*B08B 3/14* (2006.01)
*B08B 5/02* (2006.01)
*B08B 9/032* (2006.01)

(52) U.S. Cl. .......... 210/251; 210/263; 134/10; 134/22.1; 134/34; 134/104.2; 134/198; 55/440

(58) Field of Classification Search ............ 55/440
See application file for complete search history.

(56) References Cited

U.S. PATENT DOCUMENTS

| | | | | |
|---|---|---|---|---|
| 1,834,534 A * | 12/1931 | Richards et al. | ............... | 55/440 |
| 1,926,924 A * | 9/1933 | Sylvan | ........... | 55/440 |
| 2,760,597 A * | 8/1956 | Brixius | ........... | 55/440 |
| 2,804,903 A * | 9/1957 | Davies | ........... | 150/157 |
| 2,862,222 A * | 12/1958 | Cockrell | ........... | 15/302 |
| 2,878,892 A * | 3/1959 | Field | ........... | 96/229 |
| 2,922,173 A * | 1/1960 | Lind et al. | ........... | 15/3 |
| 3,219,188 A * | 11/1965 | Hirs | ........... | 210/108 |
| 3,263,341 A * | 8/1966 | Allen | ........... | 34/60 |
| 3,384,239 A * | 5/1968 | Berardi | ........... | 210/798 |
| 3,502,215 A * | 3/1970 | Cahan | ........... | 210/167 |
| 3,527,030 A * | 9/1970 | Hungate | ........... | 55/440 |
| 3,533,395 A * | 10/1970 | Yaste | ........... | 126/271.1 |
| 3,550,778 A * | 12/1970 | Kesselman | ........... | 210/167 |
| 3,564,820 A * | 2/1971 | Nelson | ........... | 96/392 |
| 3,601,832 A * | 8/1971 | Cook | ........... | 15/141.1 |
| 3,612,075 A * | 10/1971 | Cook | ........... | 134/99.1 |

(Continued)

FOREIGN PATENT DOCUMENTS

WO    WO 9640453 A1 * 12/1996

(Continued)

*Primary Examiner*—Robert James Popovics
(74) *Attorney, Agent, or Firm*—DLA Piper US LLP (57) ABSTRACT

A system and method for washing engines and for collecting and treating the waste water from engine washing operations. The system includes a collecting device for collecting waste liquid during a washing operation of the engine and a treatment device for treating waste liquid collected during the washing operation. The system may be advantageously arranged on a mobile cart having a chassis provided with wheels. The mobile cart also includes an adjusting device for adjusting the vertical position of liquid separating and collecting components relative to the engine.

27 Claims, 9 Drawing Sheets

U.S. PATENT DOCUMENTS

| | | | |
|---|---|---|---|
| 3,616,623 A * | 11/1971 | Reid | 55/440 |
| 3,623,668 A * | 11/1971 | Freid et al. | 239/265.17 |
| 3,646,980 A * | 3/1972 | Peterson | 244/129.4 |
| 3,766,719 A * | 10/1973 | McAnally, III | 55/306 |
| 3,774,625 A * | 11/1973 | Wiltrout | 134/104.2 |
| 3,835,498 A * | 9/1974 | Arato | 15/53.2 |
| 3,911,938 A * | 10/1975 | Wiltrout | 134/104.1 |
| 3,923,658 A * | 12/1975 | Lancaster | 210/108 |
| 3,938,972 A * | 2/1976 | Sugimura | 55/440 |
| 4,029,114 A * | 6/1977 | Wiltrout | 134/104.1 |
| 4,059,123 A * | 11/1977 | Bartos et al. | 134/102.2 |
| 4,065,322 A * | 12/1977 | Langford | 134/7 |
| 4,158,449 A * | 6/1979 | Sun et al. | 244/136 |
| 4,168,232 A * | 9/1979 | Allen et al. | 210/788 |
| 4,191,348 A * | 3/1980 | Holwerda | 244/134 C |
| 4,196,020 A * | 4/1980 | Hornak et al. | 134/167 R |
| 4,225,188 A * | 9/1980 | McGuire et al. | 299/64 |
| 4,234,323 A * | 11/1980 | Maher | 95/278 |
| 4,300,918 A * | 11/1981 | Cary | 95/268 |
| 4,378,755 A * | 4/1983 | Magnusson et al. | 118/684 |
| 4,530,707 A * | 7/1985 | Ovard | 55/440 |
| 4,543,108 A * | 9/1985 | Wurz | 95/272 |
| 4,557,740 A * | 12/1985 | Smith | 55/440 |
| 4,642,192 A | 2/1987 | Heskett | |
| 4,652,368 A * | 3/1987 | Ennis et al. | 210/97 |
| 4,713,120 A * | 12/1987 | Hodgens et al. | 134/3 |
| H535 H * | 10/1988 | Sam et al. | 55/296 |
| 4,802,901 A * | 2/1989 | Wurz et al. | 55/440 |
| 4,834,912 A * | 5/1989 | Hodgens et al. | 510/186 |
| 4,975,101 A * | 12/1990 | Swanborn | 55/440 |
| 5,011,540 A * | 4/1991 | McDermott | 134/23 |
| 5,018,355 A * | 5/1991 | Foster | 60/646 |
| 5,090,588 A * | 2/1992 | Van Romer et al. | 220/573 |
| 5,093,012 A * | 3/1992 | Bundy et al. | 210/765 |
| 5,114,098 A * | 5/1992 | Campbell | 244/121 |
| 5,137,555 A * | 8/1992 | Fewel, Jr. | 55/440 |
| 5,160,430 A * | 11/1992 | Gasser et al. | 210/138 |
| 5,193,976 A * | 3/1993 | Kolev et al. | 415/116 |
| 5,268,011 A * | 12/1993 | Wurz | 55/440 |
| 5,269,823 A * | 12/1993 | Wurz | 55/440 |
| 5,273,395 A * | 12/1993 | McDermott | 415/121.3 |
| 5,330,579 A * | 7/1994 | Rushing et al. | 134/12 |
| 5,354,014 A * | 10/1994 | Anderson | 244/134 C |
| 5,374,352 A * | 12/1994 | Pattee | 210/104 |
| 5,458,299 A * | 10/1995 | Collins et al. | 244/134 C |
| 5,462,655 A * | 10/1995 | Ladd et al. | 210/167 |
| 5,464,459 A * | 11/1995 | VanBuskirk et al. | 96/356 |
| 5,498,329 A * | 3/1996 | Lamminen et al. | 210/86 |
| 5,556,535 A * | 9/1996 | Van Der Est | 210/140 |
| 5,618,353 A * | 4/1997 | Irvine et al. | 134/22.17 |
| 5,669,982 A * | 9/1997 | Latimer | 134/10 |
| 5,725,611 A * | 3/1998 | Wright et al. | 44/375 |
| 5,868,860 A * | 2/1999 | Asplund | 134/22.1 |
| 5,899,217 A * | 5/1999 | Testman, Jr. | 134/104.4 |
| 5,972,062 A * | 10/1999 | Zimmermann | 55/440 |
| 6,017,377 A * | 1/2000 | Brown et al. | 55/435 |
| 6,021,792 A * | 2/2000 | Petter et al. | 134/111 |
| 6,073,637 A * | 6/2000 | Hayward et al. | 134/22.1 |
| 6,080,225 A * | 6/2000 | Forster | 95/57 |
| 6,155,277 A * | 12/2000 | Barry | 134/104.4 |
| 6,164,298 A * | 12/2000 | Petter et al. | 134/104.4 |
| 6,310,022 B1 * | 10/2001 | Amiran | 510/185 |
| 6,394,108 B1 * | 5/2002 | Butler | 134/22.18 |
| 6,402,855 B1 * | 6/2002 | Damron et al. | 134/10 |
| 6,470,668 B2 * | 10/2002 | Payling et al. | 60/39.3 |
| 6,478,033 B1 * | 11/2002 | Foster | 134/22.18 |
| 6,484,508 B2 * | 11/2002 | Rocklin et al. | 60/775 |
| 6,491,048 B1 * | 12/2002 | Foster | 134/169 A |
| 6,503,334 B2 * | 1/2003 | Ruiz et al. | 134/18 |
| 6,553,768 B1 * | 4/2003 | Trewin et al. | 60/772 |
| 6,565,758 B1 * | 5/2003 | Thomas | 210/776 |
| 6,630,198 B2 * | 10/2003 | Ackerman et al. | 427/239 |
| 6,883,527 B2 * | 4/2005 | Travaly et al. | 134/22.18 |
| 6,932,093 B2 * | 8/2005 | Ogden et al. | 134/22.1 |
| 6,964,699 B1 * | 11/2005 | Carns et al. | 96/361 |
| 7,018,965 B2 * | 3/2006 | Yan et al. | 510/185 |
| 7,065,955 B2 * | 6/2006 | Reback et al. | 60/39.55 |
| 7,150,431 B2 * | 12/2006 | Dennis | 244/53 R |
| 7,185,663 B2 * | 3/2007 | Koch et al. | 134/22.19 |
| 7,198,052 B2 * | 4/2007 | Watt | 134/22.1 |
| 2003/0209256 A1 | 11/2003 | Tadayon | |
| 2005/0199271 A1 * | 9/2005 | Watt | 134/22.1 |
| 2006/0048796 A1 * | 3/2006 | Asplund et al. | 134/21 |
| 2006/0060218 A1 * | 3/2006 | Lakdawala et al. | 134/22.1 |
| 2006/0060233 A1 * | 3/2006 | Lakdawala et al. | 134/169 A |
| 2006/0081521 A1 * | 4/2006 | Hjerpe | 210/171 |
| 2006/0219269 A1 * | 10/2006 | Rice et al. | 134/34 |
| 2006/0243008 A1 * | 11/2006 | Asplund et al. | 134/22.12 |
| 2007/0000528 A1 * | 1/2007 | Asplund et al. | 134/166 R |
| 2007/0048127 A1 * | 3/2007 | O'Neill et al. | 415/169.1 |
| 2007/0059159 A1 * | 3/2007 | Hjerpe | 415/117 |

FOREIGN PATENT DOCUMENTS

| | | |
|---|---|---|
| WO | WO 2004055334 A1 * | 7/2004 |
| WO | WO 2005028119 A1 * | 3/2005 |
| WO | WO 2005077554 A1 * | 8/2005 |

* cited by examiner

SYSTEM AND DEVICES FOR COLLECTING AND TREATING WASTE WATER FROM ENGINE WASHING

This is a nationalization of PCT/SE04/000922 filed Jun. 14, 2004 and published in English.

TECHNICAL FIELD

The present invention generally relates to the field of washing jet engines, particularly using washing liquids such as water and detergent or water only, and more specifically to a system, and devices for collecting and treating the waste water from engine washing operations and a mobile cart comprising such a system.

BACKGROUND OF THE INVENTION

A gas turbine engine installed as an aircraft engine comprises a compressor compressing ambient air, a combustor burning fuel together with the compressed air and a turbine for driving the compressor. The expanding combustion gases drive the turbine and also result in thrust used for propelling the aircraft.

Air breathing machines like jet engines consume large quantities of air. Air contains foreign particles in form of aerosols or larger particles which then enters the engine with the air stream. The majority of the particles will follow the gas path through the engine and exit with the exhaust gases. However, there are particles with properties of sticking on to components in the engine's gas path changing the aerodynamic properties of the engine and more particularly reducing engine performance. Typical contaminants found in the aviation environment are pollen, insects, engine exhaust, leaking engine oil, hydrocarbons coming from industrial activities, salt coming from nearby sea, chemicals coming from aircraft de-icing and airport ground material such as dust.

The contaminants sticking on to components in the engine gas path cause fouling of the engine. The consequence of gas path fouling is an engine operating less efficient. With the reduction in efficiency follows that the engine is less economic to operate and has higher emissions. Fouling will result in more fuel having to be burnt for achieving the same thrust as for the clean engine. Further, an environmental drawback is found with the higher fuel consumption in form of increased carbon dioxide emissions. In addition, more fuel being burnt results in higher temperatures in the engine's combustor. With this follows high temperature exposure to engine hot section components. The higher temperature exposures will shorten the life time of the engine. The higher firing temperature results in increased formation of NOx which is yet another environmental drawback. In summary, the operator of a fouled engine suffers from reduced engine lifetime, unfavourable operating economics and higher emissions. The airline operators have therefore a strong incentive keeping the engine clean.

It has been found that the only reasonable way to combat fouling is to wash the engine. Washing can be practised by directing a water jet from a garden hose towards the engine inlet. However, this method has limited success due to the simple nature of the process. An alternative method is pumping the wash liquid through a manifold with special nozzles directed towards the engine inlet face. The manifold would be temporarily installed on the engine cowl or on the engine shaft bullet during the wash operation. Simultaneously with spraying the washing liquid towards the engine inlet, the engine shaft is cranked by the use of its starter motor. The shaft rotation enhances the wash result by the mechanical movements. The shaft rotation allows the wash liquid to move over greater surface area as well as enhancing liquid penetration into the interior of the engine. The method is proven successful on most gas turbine jet engines types such as turbojets, turboprop, turboshaft and mixed or un-mixed turbofan engines.

A proper wash operation of a gas turbine engine can be confirmed by an observation that the wash liquid exits the engine at the engine outlet. At the engine outlet the wash liquid has become a waste liquid. The waste liquid may leave the engine outlet as a stream of liquid pouring to the ground. Alternatively may the waste liquid be carried with the air stream as fine droplets where the air stream is the result of the rotation of the engine shaft. This air borne liquid can be carried a significant distance before falling to the ground. It is shown from actual wash operations that waste liquid will be spread on a large surface area, typically more than 20 meters downstream of the engine outlet. It is not desired to spread waste liquid on the ground. It is the purpose of this invention to provide a method and apparatus to collect the waste liquid exiting the engine.

The waste liquid exiting the engine at washing consists of the wash liquid entering the engine together with released fouling material, combustion solids, compressor and turbine coating material, and oil and fat products. This waste liquid may be hazardous. As an example, analysis of water collected from actual turbine engine washing operations showed to contain cadmium. The cadmium comes from compressor blade coating material released during washing operation. Cadmium is environmentally very sensitive and can not be allowed to be disposed to the effluent. This waste liquid would have to undergo treatment for separation of hazardous components before being disposed in a sewer.

Gas turbine aircraft engines can be of different types such as turbojets, turboprop, turbo-shaft and mixed or un-mixed turbofan engines. These engines cover a large performance range and may comprise of different design details by different manufactures. Aircrafts types for a defined service may be offered from different aircraft manufacturers thus the design of the aircraft and its engines may vary. Further, the aircraft manufacturer may offer different engine options for the same aircraft type. The large combined possibility of engines on aircraft types and from different aircraft manufacturers result in a practical problem in designing a system for collecting and treating of waste wash liquid that is generally applicable to most winged aircraft. U.S. Pat. No. 5,899,217 to Testman, Jr. discloses an engine wash recovery system that is limited to small and particularly turboprop engines as the container used in the invention is not applicable to the air flows emanating from e.g. large turbo-fan engines.

Collecting waste water from engine washing may be accomplished by hanging canvas like collectors under the engine nacelle. However, any operation resulting in anything being hooked on to an engine has the disadvantage that it may be subject to engine damage

SUMMARY OF THE INVENTION

Thus, it is an object of this invention to provide a method and apparatus enabling collecting and treating waste water from engine washing for a large range of aircraft types including the largest aircraft types.

It is a further object of the present invention to provide a method and apparatus for removing hazardous components from the waste water before disposing it.

It is an additional object of the present invention to provide a method and apparatus for collecting and treating waste water from engine washing having no physical contact between the collector device and engine.

It is yet another object of the present invention to provide a method and apparatus for enabling clean engine operations.

These and other objects are achieved according to the present invention by providing devices and systems having the features defined in the independent claims. Preferred embodiments are defined in the dependent claims.

According to a first aspect of the present invention, there is provided a system for collecting and treating waste liquid from engine washing. The system comprises a collecting device for collecting waste liquid during a washing operation of an engine, wherein the collecting device comprises liquid separating means having an inlet face and an outlet face arranged to separate washing liquids from the air stream entering the inlet face, which air stream emanates from the engine during the washing operating of the engine; and liquid collecting means for collecting separated liquid from liquid separating means and liquid exiting the engine resulting from the washing operation. Furthermore, the system comprises a treatment device for treating waste liquid collected during the washing operation, wherein the treatment device comprises filter means arranged to remove particles and ions from the liquid, wherein the treatment device is connected to the collecting device such that waste liquid is directed from the liquid collecting means to the treatment device for treatment in the filter means.

According to a second aspect of the present invention, there is provided a collecting device for collecting waste liquid during a washing operation of an engine, wherein the collecting device comprises liquid separating means having an inlet face and an outlet face arranged to separate washing liquids from the air stream entering the inlet face, which air stream emanates from the engine during the washing operating of the engine; and liquid collecting means for collecting separated liquid from liquid separating means and liquid exiting the engine resulting from the washing operation.

According to a third aspect of the present invention, there is provided a treatment device for treating waste liquid collected during a washing operation, wherein the treatment device comprises filter means arranged to remove particles and ions from the liquid.

According to a further aspect of the present invention, there is provided a mobile cart for serving a engine during a washing operation of the engine comprising a chassis provided with wheels. The cart comprises a system according to the first aspect of the present invention arranged on the chassis; adjusting means for adjusting the position of the liquid separating means and/or liquid collecting means and/or the liquid storage means relative the engine.

The solution according to the present invention provides several advantages over the existing solutions. One advantage is that hazardous particles, substances, or other types of content, such as released fouling material, combustion solids, compressor and turbine coating material, heavy metals and oil and fat products, can be removed or separated from the waste liquid resulting from a washing operation in an efficient and environmentally friendly manner Another advantage is the inventive devices and systems can be used with different types and designs of gas turbine aircraft engines, such as turbojets, turboprop, turbo-shaft and mixed or un-mixed turbofan engines, and, moreover, with different aircraft types and designs from different manufactures because the devices and systems can be accurately adjusted to a specific engine or aircraft. Accordingly, the present invention provides for a very high degree of flexibility since one system can be used for all types of engines and aircrafts, i.e. the present invention provides for a collecting and treating of waste wash liquid generally applicable to most winged aircraft. This also entails cost savings because one and the same system or mobile cart including the system can be used for all types of engines and aircrafts.

A further advantage is that there is no physical contact between the collector device and the engine, which entails that any damages of the engines can be avoided.

Further objects and advantages of the present invention will be discussed below by means exemplifying embodiments.

BRIEF DESCRIPTION OF THE DRAWINGS

Preferred embodiments of the invention will now be described in greater detail with reference to the accompanying drawings, in which.

DESCRIPTION OF PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention can be practised on several engine types such as turboshaft, turboprop, turbojet and mixed/un-mixed multi shaft turbo fan engines. The invention can be practised on under-wing mounted engines as well as tail mounted engines as further shown in FIG. 6 and FIG. 7.

Figure 1:
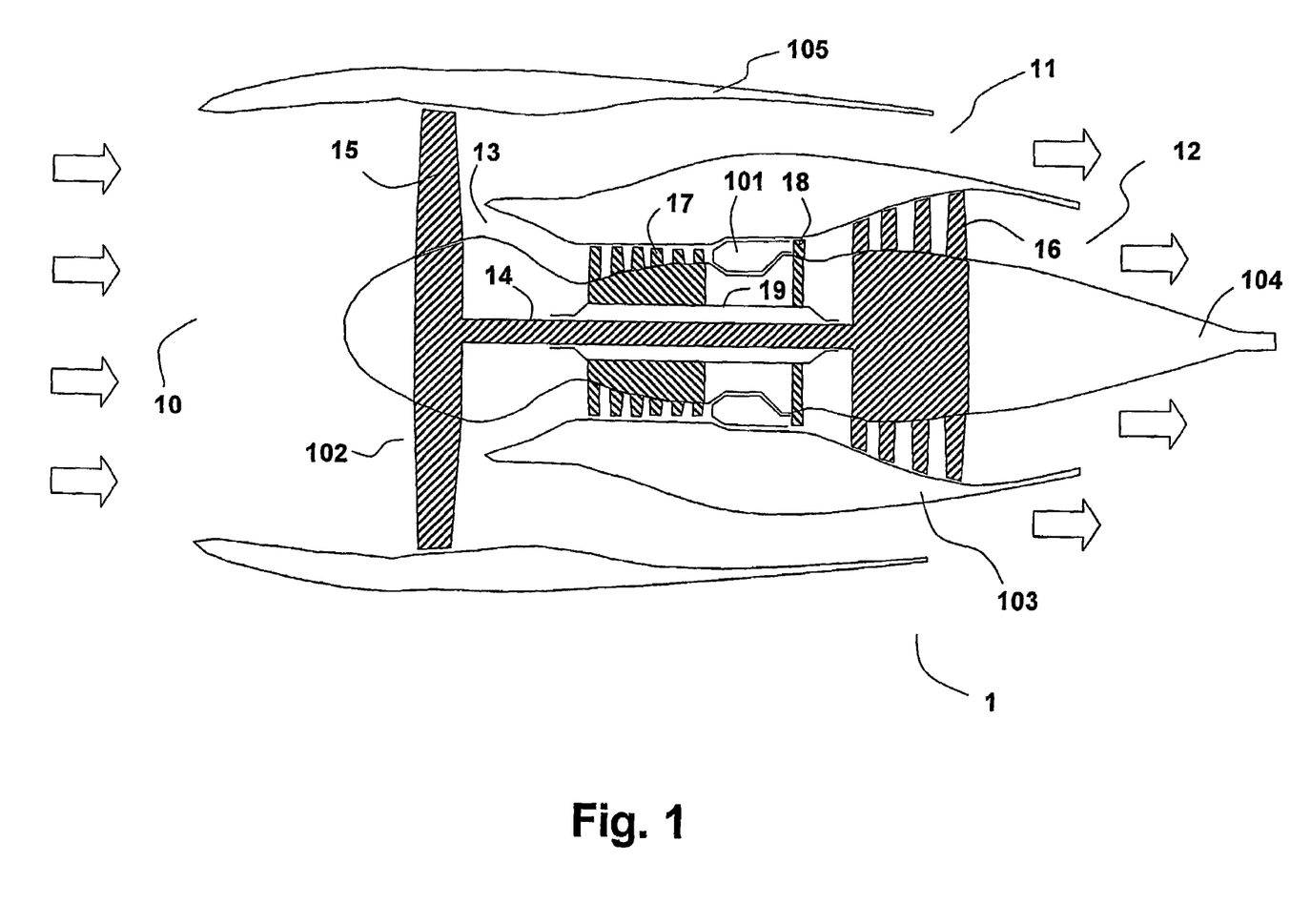
FIG. 1 shows a cross section of an un-mixed turbo-fan gas turbine engine.

FIG. 1 shows a cross section of an un-mixed turbofan engine. This engine is of a common type found on e.g. large aircraft in passenger service. Engine 1 comprises of a fan section 102 and a core engine section 103. Air flows are indicated by arrows. Engine 1 has an inlet 10 where air enters the engine. The air flow is driven by fan 15. One portion of the inlet air exits at outlet 11. The remaining portion of the inlet air enters into the core engine at inlet 13. The air to the core engine is compressed by compressor 17. The compressed air together with fuel (not shown) is combusted in combustor 101 resulting in pressurized hot combustion gases. The pressurized hot combustion gases expand towards core engine outlet 12. The expansion is done in two stages. In a first stage the combustion gases expand into an intermediate pressure while driving turbine 18. In a second stage the combustion gases expand towards ambient pressure while driving turbine 16. Turbine 16 is driving fan 15 via shaft 14. Turbine 18 is driving compressor 17 via a second shaft 19 where the second shaft 19 is in form of a coaxial to first shaft 14.

Figure 2:
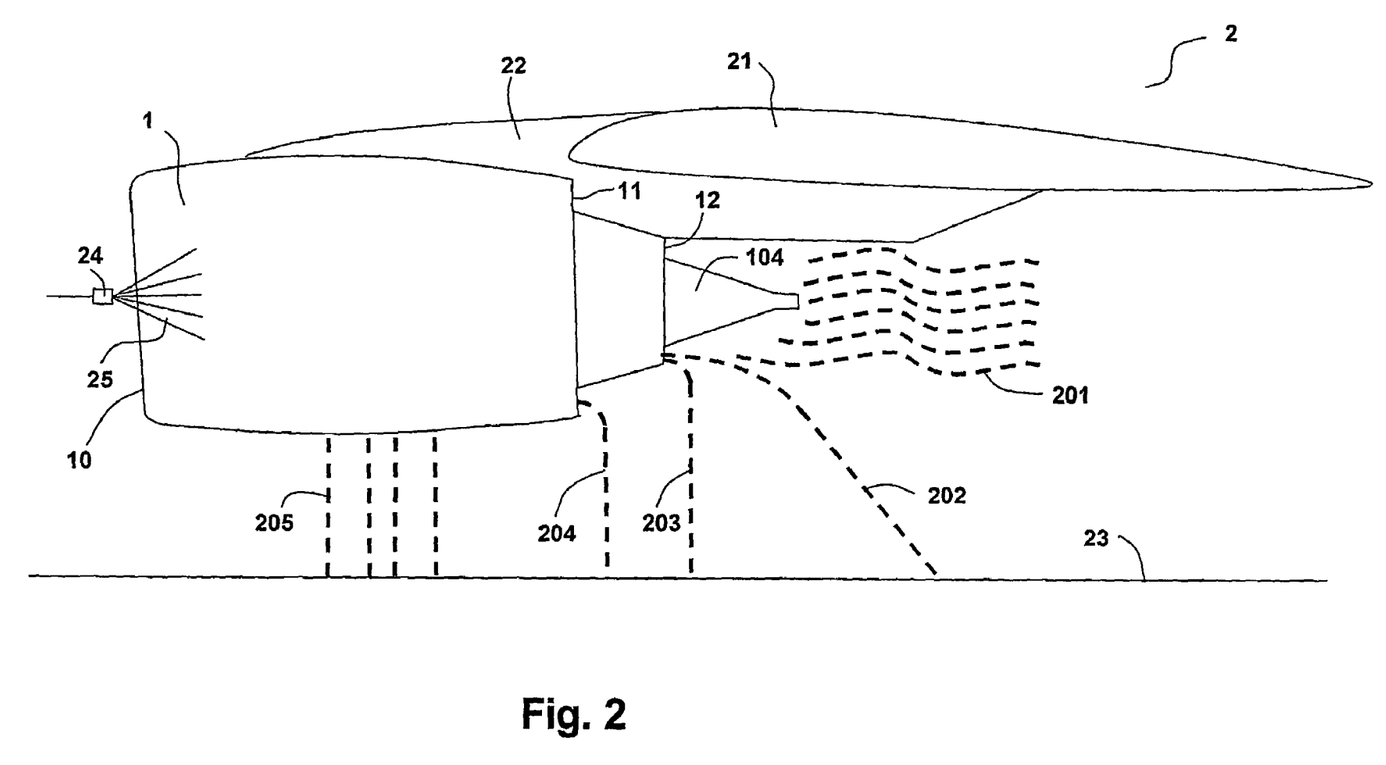
FIG. 2 shows how waste liquid may exit the un-mixed turbo-fan engine during washing thereof.

In FIG. 2 the engine described in FIG. 1 is subject to an engine wash. Similar parts are shown with the same reference numbers as FIG. 1. FIG. 2. shows a side view of engine 1. Engine 1 is an "under-wing engine" installed under wing 21 with support 22 where wing 21 is part of aircraft 2. A manifold (not shown) for injecting washing liquid is installed in the engine inlet 10 of engine 1. The manifold holds a plurality of nozzles 24 in position upstream of the fan. A wash pump unit (not shown) pumps a washing liquid through nozzles 24 forming sprays 25 directed toward the fan and core engine air inlets. The liquid cleans the gas paths of the fan and the core engine. To enhance the cleaning effect the engine shafts are cranked by the use of the engine's starter motor. Cranking of the shafts enables the liquid to move around inside the engine for achieving enhanced cleaning effect. The rotation of the shafts results in an airflow carrying the liquid towards the engine outlet hence liquid will exit the engine at the rear. Liquid exiting the engine is waste liquid.

Liquid will exit the engine in at least five different ways as described in FIG. 2. The first liquid category, stream 201, will exit the core engine outlet 12 as airborne droplets. The droplets that make up stream 201 are generated inside the engine by the motion of the compressor and turbines blades. Stream 201 comprises of droplets with a large size range where the different droplet sizes have different characteristics. The smallest droplets, i.e. droplets less than 30 microns will typically quickly evaporate in the ambient air as of their small size. Droplets less than 30 microns are therefore not so much of concern in the waste water collection process for reason of the evaporation and that they represent only a small volume of the waste liquid. The largest droplets in stream 201 are droplets in the size of raindrops, e.g. 2000 um size. These droplets are heavy and will not evaporate but fall to the ground by gravity. Droplets greater than 30 microns but less than 2000 microns will be carried with the air stream and fall by gravity to ground 23 typically up to 20 meters behind the engine outlet. The second liquid category, stream 202, consists of strings of liquid and other large chunks of liquid. Stream 202 quickly falls to the ground 23 by gravity. The third liquid category, stream 203, is liquid pouring as a solid stream out of the core engine outlet 12. This liquid pours typically vertically to ground 23. The fourth liquid category, stream 204, is liquid pouring out from the fan duct outlet 11. This liquid falls basically vertically to ground 23. The fifth liquid category, stream 205, is liquid dropping or pouring from the bottom of the engine nacelle. The source for this liquid is for example the combustor drain valves being open. According to the invention a method and apparatus is disclosed for collecting waste liquid exiting the engine as described in FIG. 2.

Figure 3:
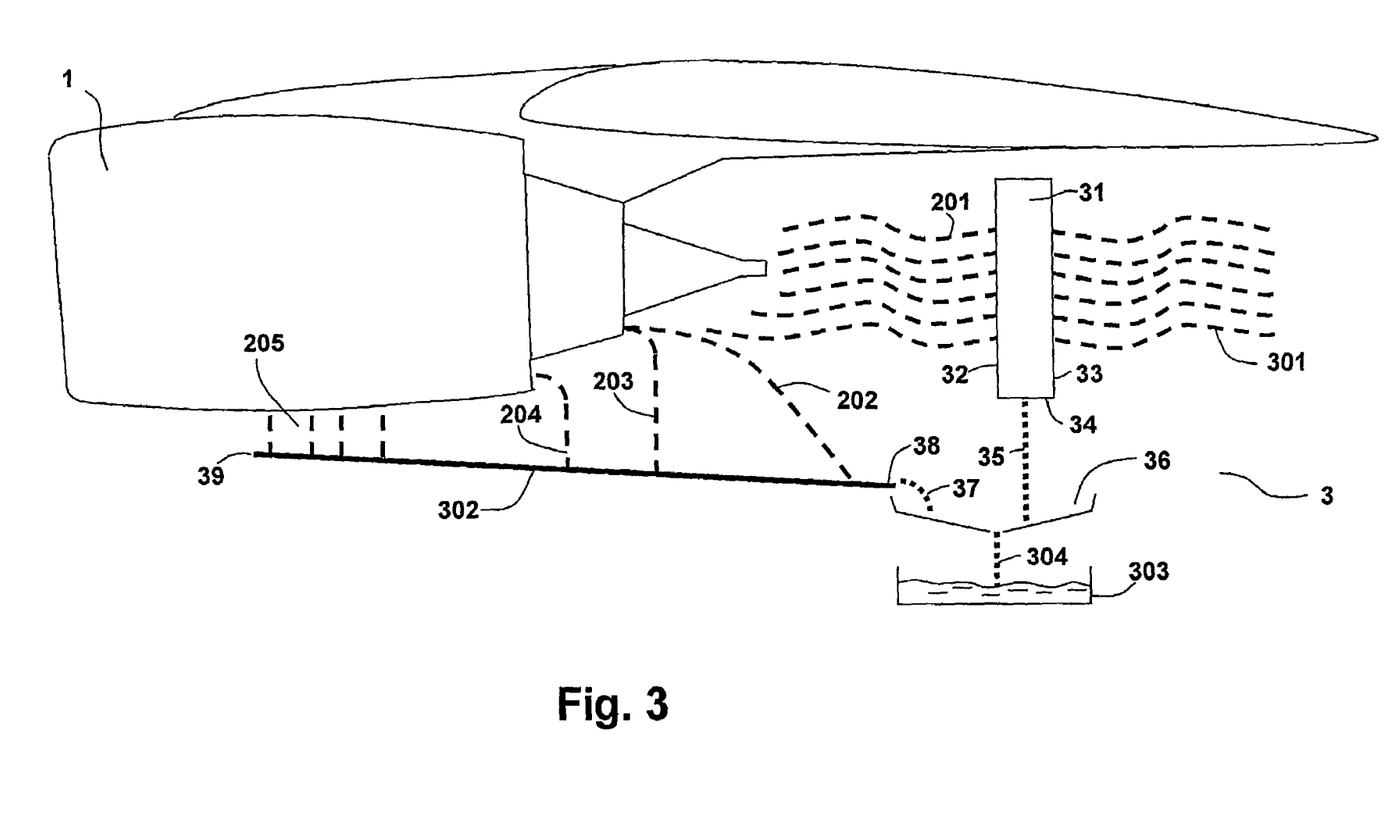
FIG. 3 shows the waste liquid collecting device according to the invention.

FIG. 3 show a side view of engine 1 and how waste liquid is collected during washing according to the invention. Similar parts are shown with the same reference numbers as FIG. 2. Collector 3 consist of a droplet separator 31, a trough 36 and a chute 302. Liquid exiting the engine as stream 201 is separated from the carrier air in droplet separator 31. Liquid exiting the engine as stream 202, stream 203, stream 204 and stream 205 are collected by chute 302. The liquid emanating from droplet separator 31 and chute 302 is collected in trough 36.

Droplet separator 31 consists of a frame enclosing droplet separator profiles. Droplet separator 31 has an inlet face 32 directed towards air stream 201 and an outlet face 33 opposite to inlet face 32. Stream 201 enters the droplet separator at inlet face 32 and exits the droplet separator at outlet face 33. The liquid is trapped in separator 31 so that stream 301 is essentially free from liquid after passing through droplet separator 31. Droplet separator 31 consists of vertically arranged separator profiles (see FIG. 8) in a frame. The separator profiles deflect the air stream. As a result the momentum of the droplets causes them to impinge onto the profile surface. The droplets coalesce together and form a liquid film. The influence of gravity on the film causes the liquid to drain to the bottom of the profile and exit the droplet separator at face 34 as stream 35. Waste liquid stream 35 falls by gravity into trough 36.

Figure 8:
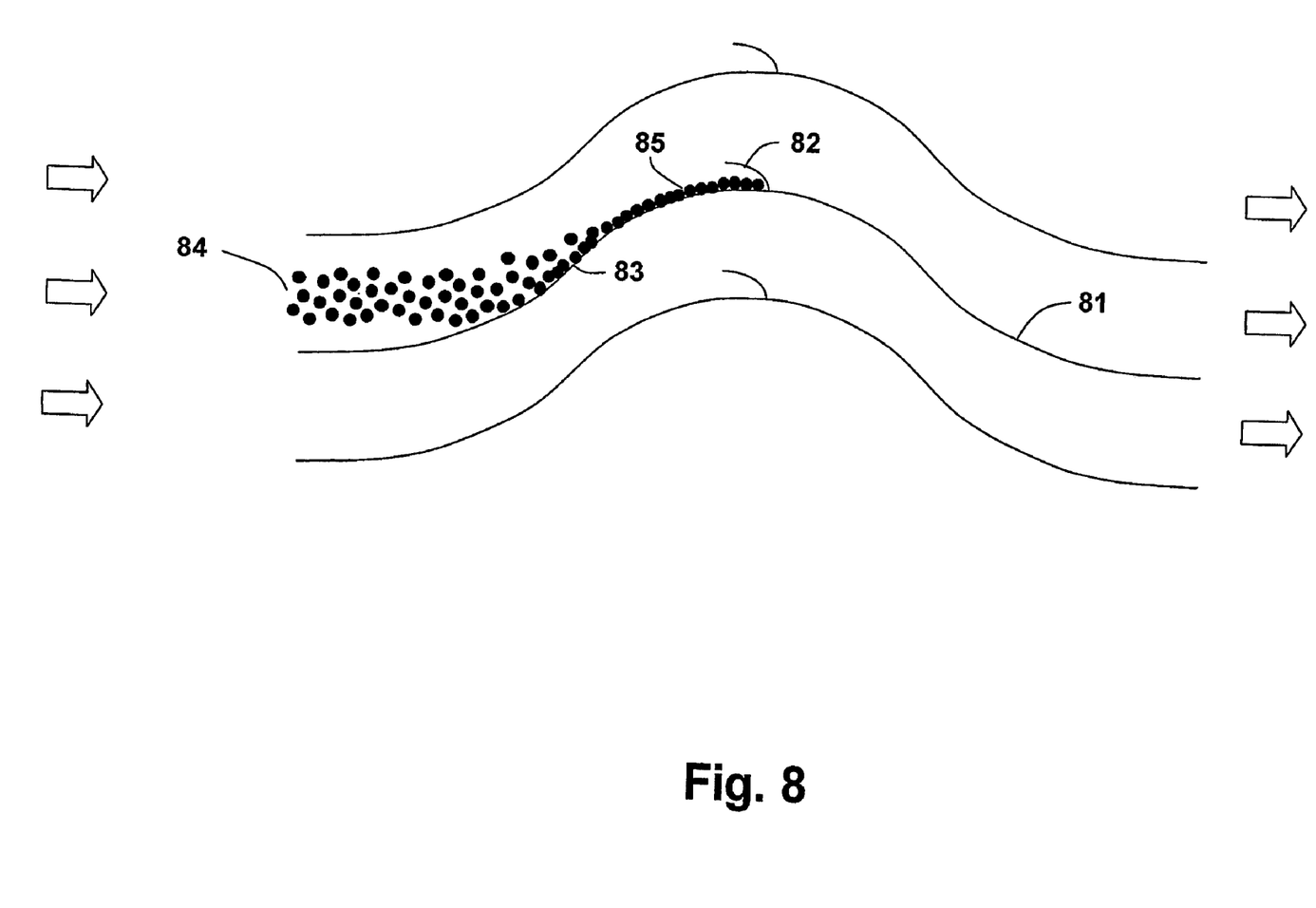
FIG. 8 shows an embodiment of the separator profiles of the droplet separator shown in FIG. 3.

Droplet separator 31 consists of a frame enclosing droplet separator profiles. FIG. 8 show the technique for separating air borne droplets with the use of separator profiles. The direction of the air stream is shown by arrows. The droplet separator profiles are arranged in parallel allowing for an air flow through the separator. The droplet separator profiles are arranged standing vertical allowing for liquid on the profile surface to find its way downwards by gravity. FIG. 8 shows a cross section of three droplet separator profiles looking from above and downwards. Droplet separator profile 81 is shaped as shown in FIG. 8. At about the middle distance from the leading edge to the tail edge of the profile, a liquid trap 82 is formed as a pocket for collecting liquid on the surface of profile 81. Droplets 84 are carried with the air stream in between the droplet separator profiles. Inside the separator the air is deflected as the result of the geometry of profile 81. The air flow deflection is rapid enough to not allow the droplets to follow with the air. The inertia of droplets 84 then allows the droplets to travel un-deflected and impinge on profile 81 at point 83. As liquid continues to build up on the profile surface a liquid film 85 is formed where the air stream shear forces will carry liquid 85 into liquid trap 82. In liquid trap 82 the liquid will build up and pour downwards by gravity.

FIG. 3 shows chute 302 installed under engine 1. Chute 302 will collect liquid 202, 203, 204 and 205 as shown in FIG. 3. Chute 302 has a front end 39 and a rear end 38 where front end 39 is positioned vertically higher than rear end 38. As front end 39 is higher than rear end 38, the chute is inclined. The inclination of chute 302 will allow liquid in the chute to flow from the left to the right in FIG. 3. Rear end 38 is positioned above trough 36 so that liquid will pour out of chute 302 into trough 36 as stream 37. According to an alternative embodiment, chute 302 is incorporated in trough 36 and tank 302, thereby forming one single unit.

Figure 4A:
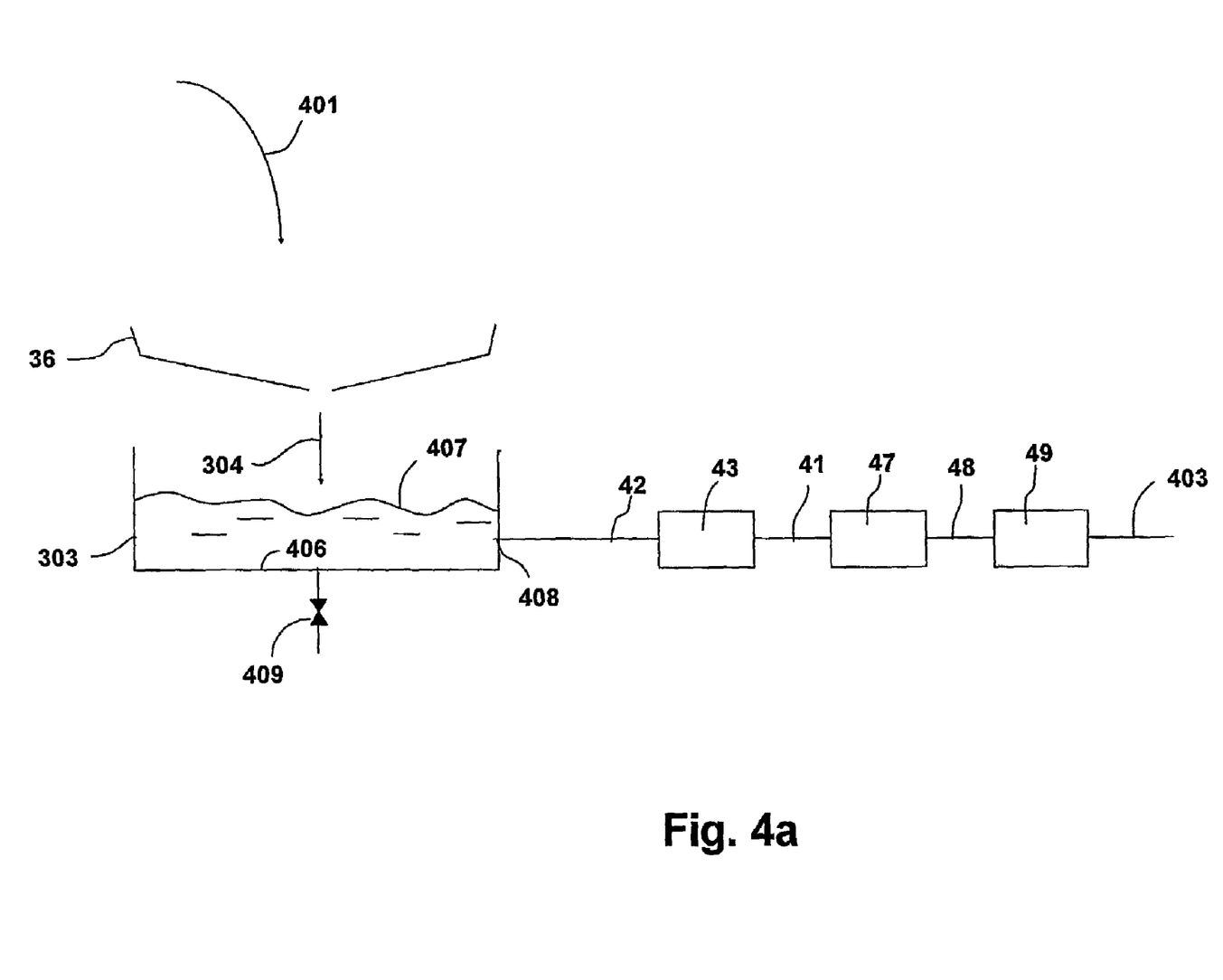
FIG. 4a shows a waste liquid treatment process prior to disposal in a sewer.
Figure 4B:
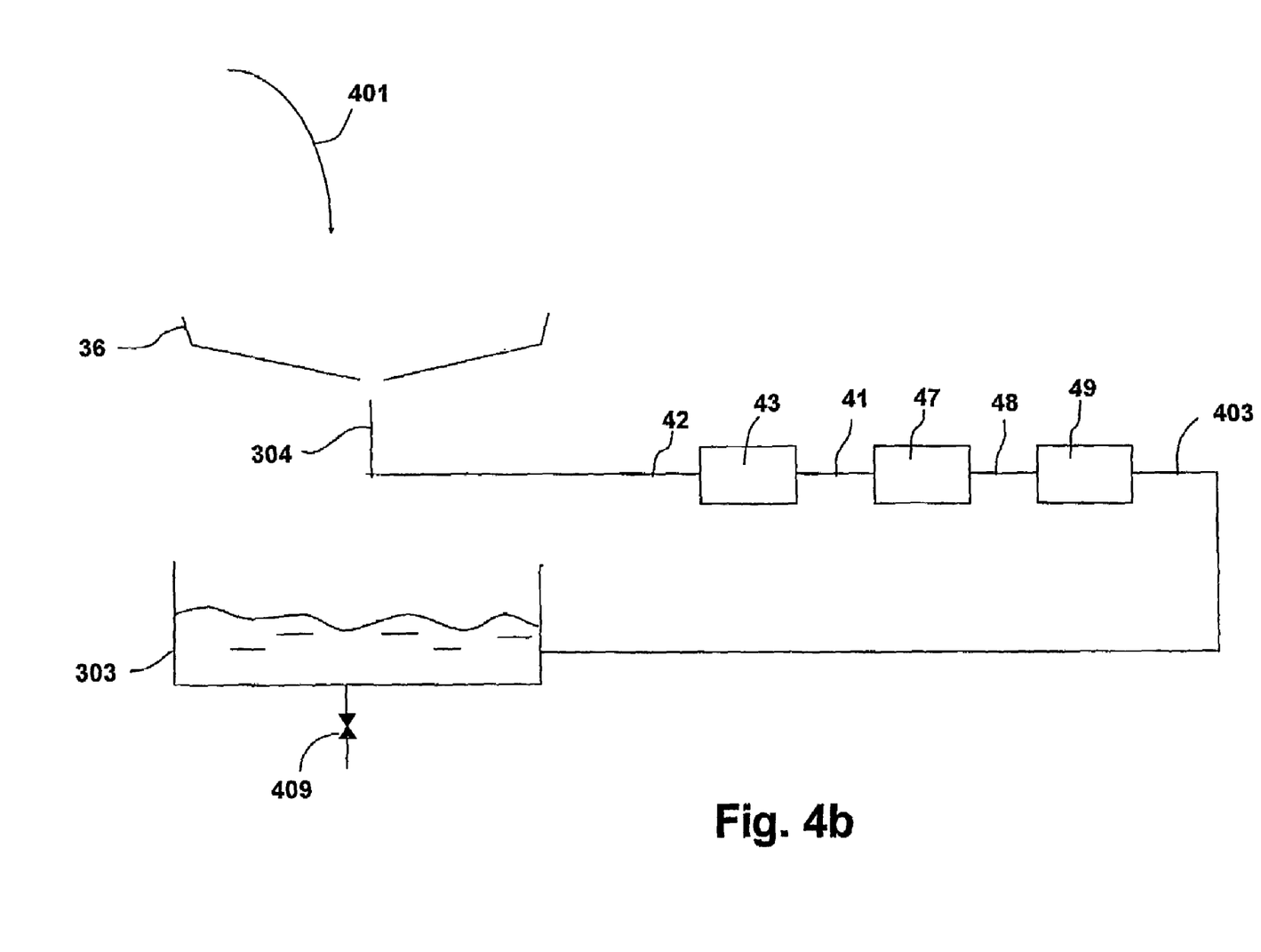
FIG. 4b shows an alternative waste liquid treatment process prior to disposal in a sewer.

The liquid that exits the engine during washing contain water, detergent and foreign matter. The foreign matter is in form of solids and ions dissolved in the water. What comes out of the engine at a specific wash occasion depends on a number of issues such as when washing was last conducted, the environment in which the engines operates, etc. Further, the waste liquid may at one wash occasion contain a high amount of solids while at another wash occasion be low on solids. Similarly, the waste liquid may at one wash occasion contain a high amount of ions while at another wash occasion be low on ions. This results in that the waste water treatment system must be flexible in its design so that the most appropriate treatment can be conducted at each occasion. The waste water treatment system described in FIG. 4a shows the components and processing according to one treatment scheme. FIG. 4b shows the same components yet a different treatment scheme. The scheme in FIG. 4a and FIG. 4b are example of two possible schemes where anyone skilled in the art can design additional schemes and yet remain within the objectives of the invention.

There may be wash occasions where the waste water is non-hazardous. In such a case processing for removal of hazardous components would be unnecessary. The non-hazardous waste liquid may then be directly disposed off into a sewer. To enable the operator of the unit to decide if the waste water should undergo further treatment before disposal or to be disposed off directly, the operator may conduct a test. A possible test for this purpose is to measure the water electric conductivity. This test allows for an on-the-spot decision for direct disposal to a sewer or allow for further processing of the waste water. A small portable and battery powered conductivity meter may be used. According to this embodiment, the test procedure would then include sticking the measurement probe into the waste water and record the conductivity reading. The recorded values would then be compared to a table of acceptable and not acceptable values representing experience gained from laboratory analysis of waste waters from engine washings. The use of a conductivity meter for measuring the electric conductivity is an example only. Depending on the engine type and the environment in which the engine operates the operator may find alternative test methods to be more appropriate.

In FIG. 4a, a trough 36 collects the waste liquid streams as stream 401. From an opening at the bottom of trough 36 the waste liquid enters tank 303. The waste liquid in tank 303 is allowed to settle for some time, typically less than 30 minutes. Particles that have a higher density than water will sediment to bottom 406 of tank 303. Particles that typically will sediment to the bottom are fuel solid residues, coked hydrocarbons, compressor fouling material, and alike. Particles with less density than water will float to surface 407 of the waste liquid. Particles that typically will float to the surface are oils, fats, pollen, insect residues, residues from bird strikes and alike. In between the bottom sediment and the surface materials the waste liquid may contain metal ions and very small particles that will not sediment to the bottom or float to the surface.

FIG. 4a shows the processing of the non-sediment waste liquid into a non-hazardous liquid. Outlet 408 of tank 303 allow waste water to exit in conduit 42. Pump 43 pumps the liquid in conduit 42 to conduit 41. The liquid will then continue to filter 47. Filter 47 is a sediment type filter of a commercially available type. This filter will separate coarse and very fine particles. After filtration in filter 47 the liquid continues in conduit 48 to filter 49. Filter 49 is a filter for separation of metal ions. Filter 49 can be a filter consisting of bed of metal particulate material matter. The metal particulate matter is chosen from metals having favourable redox potentials relative the redox potential of the waste water metal ions to establish conditions for spontaneous oxidation and reduction reactions with the metal ions. The metal particulate type filter is described in U.S. Pat. No. 4,642,192. After filtration in filter 47 and filter 49 the waste liquid is now depleted from particles and metal ions. The waste liquid continues in conduit 403 for disposal in a sewer or to a tank (not shown) for later disposal in a sewer.

Tank 303 is open at the top. After tank 303 has been drained from waste liquid, the material floating on the waste liquid surface together with the settled material at bottom 406 of tank 303 can be manually collected by wiping it out with a cloth or similar operation. This material is then allowed to be disposed of in a safe way.

If the liquid is non-hazardous it is not necessary with the processing as described above. The non-hazardous liquid may be disposed off into a sewer by opening valve 409.

The scheme in FIG. 4a is appropriate for processing waste liquids having a high amount of solids. Tank 303 is then used as settling tank for solids and thus relieving the load on sediment filter 47. FIG. 4b shows an alternative scheme to the scheme in FIG. 4a. In FIG. 4b a tank 303 is used as storage tank for storing waste liquid post processing. The scheme in FIG. 4b is appropriate for processing waste liquid with low or moderate solids content. In FIG. 4b similar parts are shown with the same reference numbers as FIG. 3 and FIG. 4a. Waste liquid leaving trough 36 as stream 304 is pumped by pump 43 in conduit 42. The liquid leaves pump 43 in conduit 41. After similar processing in filter 47 and filter 49 as shown in FIG. 4a, the liquid continues in conduit 403 to tank 303. The liquid entering tank 303 is now depleted from particulates and ions. Tank 303 will in this embodiment serve as a storage tank until it is appropriate to release its content into a sewer. The liquid is disposed into a sewer by opening valve 409.

The post processing or treatment method and device and the collection method and collection device according to the present invention can be used independently of each other.

Figure 5:
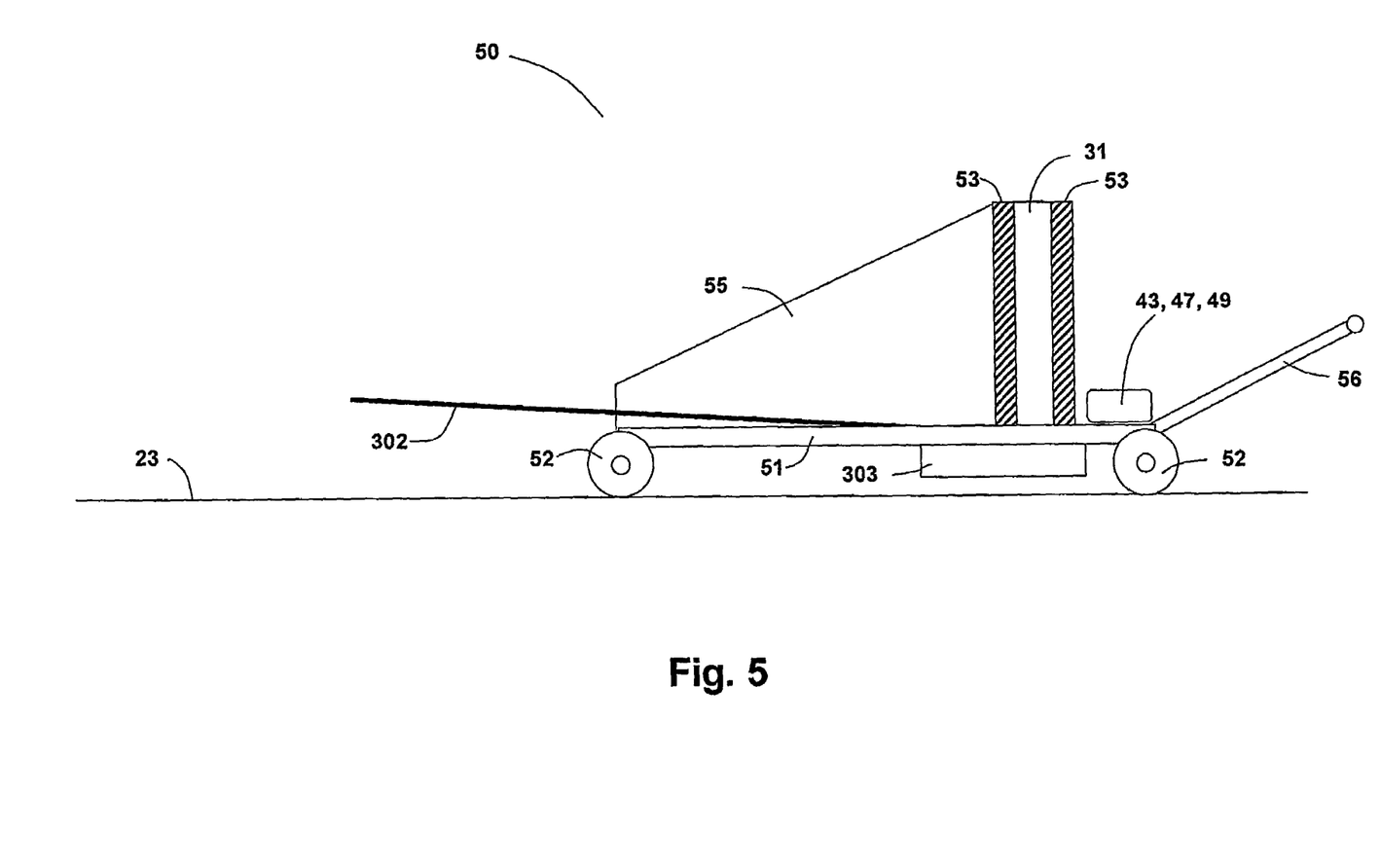
FIG. 5 shows the waste liquid collecting device and treatment device installed on a mobile cart for practical use in servicing aircraft at airports.

FIG. 5 shows the collection device and the water treatment unit installed on a mobile cart. The installation of collector 3 together with the waste water treatment unit on cart 50 allows the invention to become practical in servicing aircraft engines at airports. As one engine is being washed the unit collects and treats the waste water. After completion of the engine wash the cart is moved to the next engine of the aircraft, and so on. The installation on cart 50 as shown in FIG. 5 is an example only. Anyone skilled in the art can design the cart differently and yet remain within the objectives of the invention. Similar parts are shown with the same reference numbers as FIG. 2, FIG. 3 and FIG. 4.

Cart 50 comprises of a frame 51. Frame 51 rests on a chassis (not shown for clarity) equipped with wheels 52. Droplet separator 31 is supported by supports 53 installed on frame 51. Chute 302, trough (not shown for clarity), tank 303, pump 43, filter 47 and filter 49 are installed on frame 51. According to this embodiment tank 303 has a volume of 500 litres. A screen 55 on each left and right side of the cart prevents air borne waste liquid to escape to the sides. A handle 56 allows the cart to be hand pulled or pulled by a vehicle.

Figure 6:
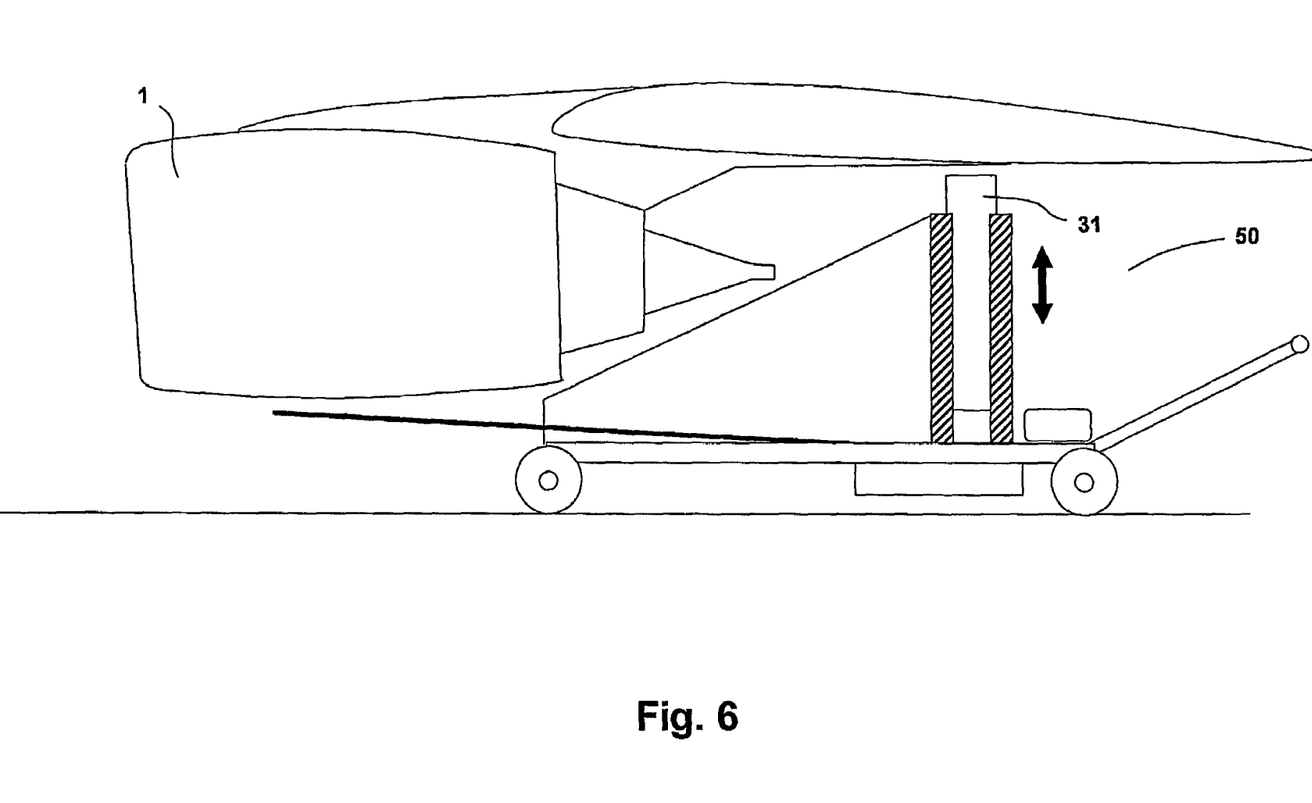
FIG. 6 shows the mobile cart with the waste water collecting device and treatment device positioned for service of an under-wing mounted engine.

FIG. 6 shows cart 50 according to the invention positioned for operation of an under-wing installed engine 1. As can be seen there is no physical contact between cart 50 and the aircraft. Droplet separator 31 is adjustable in height as indicated by arrows by means of adjusting means, which, for example, can be a hydraulic, pneumatic or chain driven unit. The adjustment in height of droplet separator 31 enables the cart to be positioned under the wing of the aircraft. The adjustment in height of droplet separator 31 enables the cart to be used for different aircraft types from different aircraft manufacturers and with different engines. According to an embodiment, the position of the droplet separator 31 can be adjusted relative the engine 1 in a vertical, horizontal, or lateral direction.

Figure 7:
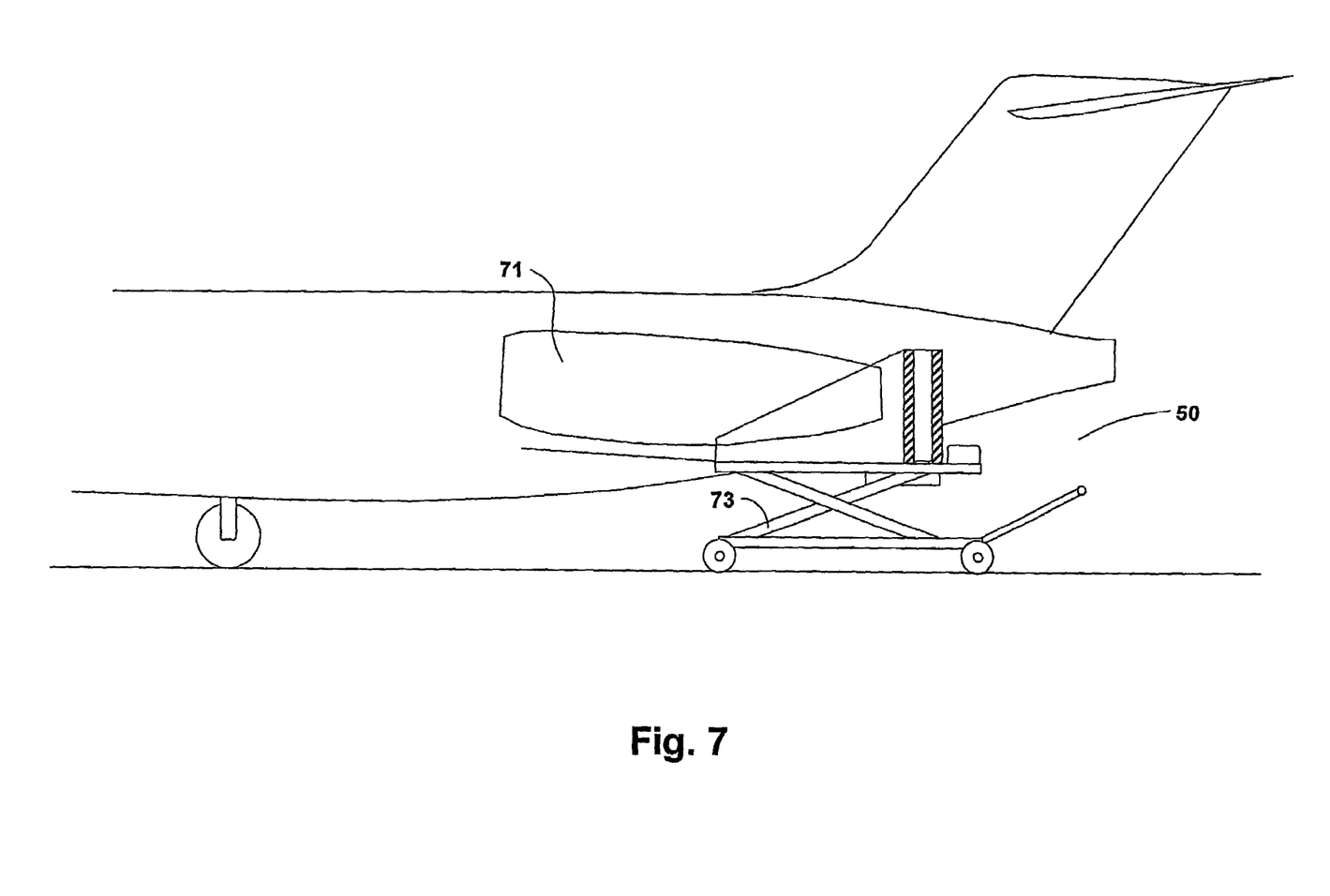
FIG. 7 shows the mobile cart with the waste water collecting device and treatment device positioned for service of a tail mounted engine.

FIG. 7 shows the cart 50 equipped with a scissor lift 73 for lifting frame 51 into position for collecting waste water from washing of a tail mounted engine 71. According to an embodiment, the position of the frame 51 can be adjusted relative the engine 71 in a vertical, horizontal, or lateral direction. The cart 50 may also comprise a motor for driving the adjusting means for the droplet separator 31 and the scissor lift 73. There is no physical contact between cart 50 and the aircraft. The use of the scissor lift 73 enables the cart to be used for different aircraft types from different aircraft manufacturers and with different engines.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the present invention. This application is intended to cover any adaptations or variations of the embodiments discussed herein. Consequently, the present invention is defined by the wordings of the appended claims and equivalents thereof.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A system for collecting and treating waste liquid from engine washing comprising:
   a collecting device for collecting waste liquid during a washing operation of an engine, said collecting device comprising a plurality of components, all of which are free of any physical connection to any portion of said engine during the washing operation, including,
   a liquid separator positioned at a distance from an outlet of said engine, said liquid separator being configured to receive washing liquid entrained in an air stream exiting said engine outlet and to separate said washing liquid from said air stream; and
   a liquid collector arranged to collect separated liquid from said liquid separator and liquid exiting the engine resulting from the washing operation; and
   a treatment device for treating waste liquid collected during said washing operation, said treatment device including a filter arranged to remove particles and ions from said liquid;
   said treatment device being connected to said liquid collecting device such that waste liquid is directed from said liquid collector to said treatment device for treatment in said filter.

2. The system according to claim 1, wherein said collecting device further comprises:
   a liquid storing component arranged to collect and store separated liquid from said liquid separator and liquid exiting the engine resulting from the washing operation collected by said liquid collector.

3. The system according to claim 2, wherein said liquid collector comprises:
   a funnel element arranged to collect separated liquid from said liquid separator; and
   a guide element arranged to be located below said engine during said washing operation in order to collect and guide liquid exiting from said engine to said funnel element.

4. The system according to claim 3, wherein said funnel element is a trough arranged to direct liquid entering an inlet opening to said liquid storing component.

5. The system according to claim 3, wherein said funnel element is directly connected to said pump.

6. The system according to claim 3, wherein said guide element is a chute having a front end and a rear end, said front end being arranged vertically higher than said rear end, said rear end being arranged at said funnel element so that liquid collected by said chute is directed to said funnel element.

7. The system according to claim 1, wherein said treatment device further includes a liquid storing component arranged to collect and store liquid treated by said filter.

8. The system according to claim 1 wherein said liquid separator includes separator profiles arranged to deflect the air stream in order to separate the droplets of the waste liquid from the air stream.

9. The system according to claim 8, wherein said liquid separator profiles are arranged to guide said liquid to an opening in a face directed against said liquid collector.

10. The system according to claim 1, wherein said filter comprises:
    a first filter arranged to remove particles from said liquid; and
    a second filter arranged to remove ions from said liquid.

11. The system according to claim 10, wherein said first filter is a sediment type filter.

12. The system according to claim 10, wherein said second filter is a metal particulate bed type filter.

13. The system according to claim 1, wherein said treatment device further comprises a pump arranged to pump liquid from said liquid storing component or from said liquid collector to said filter.

14. The system according to claim 1, further comprising a mobile cart with a wheeled chassis for serving an engine during a washing operation of said engine, said system arranged on said chassis, and an adjusting device for adjusting a position of at least one of said liquid separator, said liquid collector, and said liquid storing component relative to said engine.

15. The system according to claim 14, wherein said adjusting device is configured to adjust said position in at least one of a vertical, horizontal, or lateral direction.

16. The system according to claim 14, wherein said liquid separator is arranged on supports arranged on said chassis and said adjusting device is one of a hydraulic, pneumatic and chain driven unit.

17. The system according to claim 14, wherein said adjusting device is a scissor lift arranged on said chassis.

18. A collecting device for use with multiple engine types and sizes of engines for collecting waste liquid from washing of an engine while the engine is being cranked, wherein cranking of the engine creates an air stream through the engine, thereby entraining the washing liquid into the air stream, and with the air stream having a velocity that ranges anywhere between low to high velocities according to the engine type and size of the engine, the collecting device comprising:
    a liquid separator positioned at a spaced separation from an outlet of said engine, said liquid separator being configured to receive washing liquid entrained in an air stream exiting said engine outlet and to separate said washing liquid from said air stream; and a liquid collector positioned at a spaced separation from the engine and to collect separated liquid from said liquid separator and liquid exiting the engine resulting from the washing operation, wherein both said liquid separator and said liquid collector are free of physical connection to any portion of the engine during a waste liquid collection operation, whereby said liquid separator and said liquid collector are operable to accommodate multiple engine types and sizes of engines, and a range of air stream velocities generated as the engine is being cranked depending on the engine type and size of engine, including low velocities, high velocities and all velocities between low and high velocities.

19. The collecting device according to claim 18, further comprising:

a liquid storing component arranged to collect and store separated liquid from said liquid separator and liquid exiting the engine resulting from the washing operation collected by said liquid collector, said liquid separator, said liquid collector and said liquid storing component each being free of any physical connection to said engine.

20. The collecting device according to claim 18, wherein said liquid separator includes separator profiles arranged to deflect the air stream in order to separate the droplets of the waste liquid from the air stream.

21. The collecting device according to claim 20, wherein said liquid separator profiles are arranged to guide said liquid to an opening in a face directed against said liquid collector.

22. The collecting device according to claim 18, wherein said liquid collector comprises:

a funnel element arranged to collect separated liquid from said liquid separator; and a guide element arranged to be located below said engine during said washing operation in order to collect and guide liquid exiting from said engine to said funnel element, said funnel and guide elements each being free of any physical connection to said engine.

23. The collecting device according to claim 22, wherein said funnel element is a trough arranged to direct liquid entering a inlet opening to said storing component.

24. The collecting device according to claim 22, wherein said guide element is a chute having a front end and a rear end, said front end being arranged vertically higher than said rear end, wherein said rear end is arranged at said funnel element so that liquid collected by said chute is directed to said funnel element.

25. The collecting device according to claim 18, further comprising an adjusting device for adjusting a position of at least one of said liquid separator and said liquid collector relative to said engine in order to accommodate multiple engine types and sizes of engines.

26. The collecting device according to claim 25, wherein said adjusting device is configured to adjust said position in at least one of a vertical, horizontal, and lateral direction.

27. The collecting device according to claim 26, further comprising a mobile cart with a wheeled chassis for serving an engine during a washing operation of said engine, with at least one said liquid separator and said liquid collector being arranged on said chassis.

* * * * *